United States Patent
Crane et al.

(10) Patent No.: US 8,672,383 B2
(45) Date of Patent: Mar. 18, 2014

(54) MODULE LOAD ENABLING BRACKET

(75) Inventors: Michael W. Crane, Rochester, MI (US);
Martin R. Matthews, Troy, MI (US);
Gari Schalte, Oakland Township, MI (US)

(73) Assignee: Magna International Inc., Aurora, Ontario (CA)

( * ) Notice: Subject to any disclaimer, the term of this patent is extended or adjusted under 35 U.S.C. 154(b) by 205 days.

(21) Appl. No.: 13/138,349

(22) PCT Filed: Feb. 5, 2010

(86) PCT No.: PCT/CA2010/000162
§ 371 (c)(1),
(2), (4) Date: Aug. 4, 2011

(87) PCT Pub. No.: WO2010/088772
PCT Pub. Date: Aug. 12, 2010

(65) Prior Publication Data
US 2011/0298239 A1 Dec. 8, 2011

Related U.S. Application Data

(60) Provisional application No. 61/207,046, filed on Feb. 6, 2009.

(51) Int. Cl.
*B62D 24/00* (2006.01)
(52) U.S. Cl.
USPC .................. 296/29; 296/35.1; 296/146.11
(58) Field of Classification Search
USPC ........ 296/193.09, 198, 35.1, 29, 102, 146.11; 293/102, 120, 155, 150
See application file for complete search history.

(56) References Cited

U.S. PATENT DOCUMENTS

| 5,178,433 A | | 1/1993 | Wagner |
| 5,358,302 A | * | 10/1994 | Schoen et al. .................. 296/29 |
| 5,597,198 A | * | 1/1997 | Takanishi et al. ........ 296/193.09 |

(Continued)

FOREIGN PATENT DOCUMENTS

| CA | 2297783 A1 | 7/2001 |
| CA | 2539425 A1 | 3/2005 |

(Continued)

OTHER PUBLICATIONS

International Search Report and Written Opinion for International Application No. PCT/CA2010/1000162 Filed on Apr. 12, 2010.

*Primary Examiner* — Glenn Dayoan
*Assistant Examiner* — Pinel Romain
(74) *Attorney, Agent, or Firm* — Warn Partners, P.C.

(57) ABSTRACT

The present invention is a moveable connector for connecting two components on a vehicle. The connector has a body portion, and a first end formed as part of the body portion. The connector is movable about at least one axis located at the first end of the body portion. The connector is also connected to a first vehicle component, such as a carrier, using the first end of the body portion. There is also a second end formed as part of the body portion. The second end is operable for being connected to a second vehicle component, such as a fender. During assembly, the first vehicle component is positioned relative to the second vehicle component, and the connector is pivoted about the axis to allow the second end of the body portion to be connected to the second vehicle component.

17 Claims, 5 Drawing Sheets

(56) References Cited

U.S. PATENT DOCUMENTS

| | | | |
|---|---|---|---|
| 6,257,656 B1 * | 7/2001 | Cook et al. | 296/191 |
| 6,286,867 B1 * | 9/2001 | Braemig et al. | 280/784 |
| 6,659,532 B2 * | 12/2003 | Bon | 296/102 |
| 6,669,274 B2 * | 12/2003 | Barnard et al. | 296/193.1 |
| 7,410,209 B2 * | 8/2008 | Clapie | 296/193.09 |
| 7,540,550 B1 * | 6/2009 | Huber et al. | 296/29 |
| 8,297,680 B2 * | 10/2012 | Schmid | 296/102 |
| 2010/0187840 A1 * | 7/2010 | Schmid | 293/102 |

FOREIGN PATENT DOCUMENTS

| | | |
|---|---|---|
| EP | 1916178 A1 | 4/2008 |
| WO | 9834045 A1 | 8/1998 |
| WO | 2008002222 A1 | 1/2008 |

* cited by examiner

MODULE LOAD ENABLING BRACKET

CROSS-REFERENCE TO RELATED APPLICATIONS

This application is a National Stage of International Application No. PCT/CA2010/000162, filed Feb. 5, 2010. This application claims priority to U.S. Patent Application No. 61/207,046 filed on Feb. 6, 2009. The disclosures of the above applications are incorporated herein by reference.

FIELD OF THE INVENTION

The present invention relates to a device or connector which allows for a front end module for a vehicle to pass through a relatively narrow opening between a set of body panels or other body structures, where the connector is able to change position to connect the carrier to the body structure.

BACKGROUND OF THE INVENTION

There are many types of connectors used for providing proper alignment and connection between various body panels and frame components of a motor vehicle. Body panels such as the hood, fenders, trunk, etc, which are manufactured using different materials (such as metal or various types of thermoformed plastics) and methods often have different tolerances and shapes. Designers of these body panels have to take into account how the panels will be connected together, and how the panels will be connected to other parts of the vehicle, such as a carrier, while still maintaining the desired design shape. A carrier is a device which is used for mounting various devices used in vehicle operation, such as the power steering pump, headlight, radiator fan shroud, windshield washer coolant, among others. In some instances, the shape of the body panels increases the complexity of the design of any connector used to connect the body panels to one another, or to a carrier.

Accordingly, there exists a need for an improved connector which allows for greater flexibility for connecting a carrier to a body panel of a vehicle.

SUMMARY OF THE INVENTION

The present invention is a moveable connector for connecting two components on a vehicle. The connector has a body portion, and a first end formed as part of the body portion. The connector is movable about at least one axis located at the first end of the body portion. The connector is also connected to a first vehicle component, such as a carrier, using the first end of the body portion.

There is also a second end formed as part of the body portion. The second end is operable for being connected to a second vehicle component, such as a fender. During assembly, the first vehicle component is positioned relative to the second vehicle component, and the connector is pivoted about the axis to allow the second end of the body portion to be connected to the second vehicle component.

The connector is movable about the axis from a first or stowed position, which reduces the overall dimensions of the first vehicle component during assembly to prevent interference when assembled to the second vehicle component, to a second or deployed position for providing a connection between the two vehicle components.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 5:
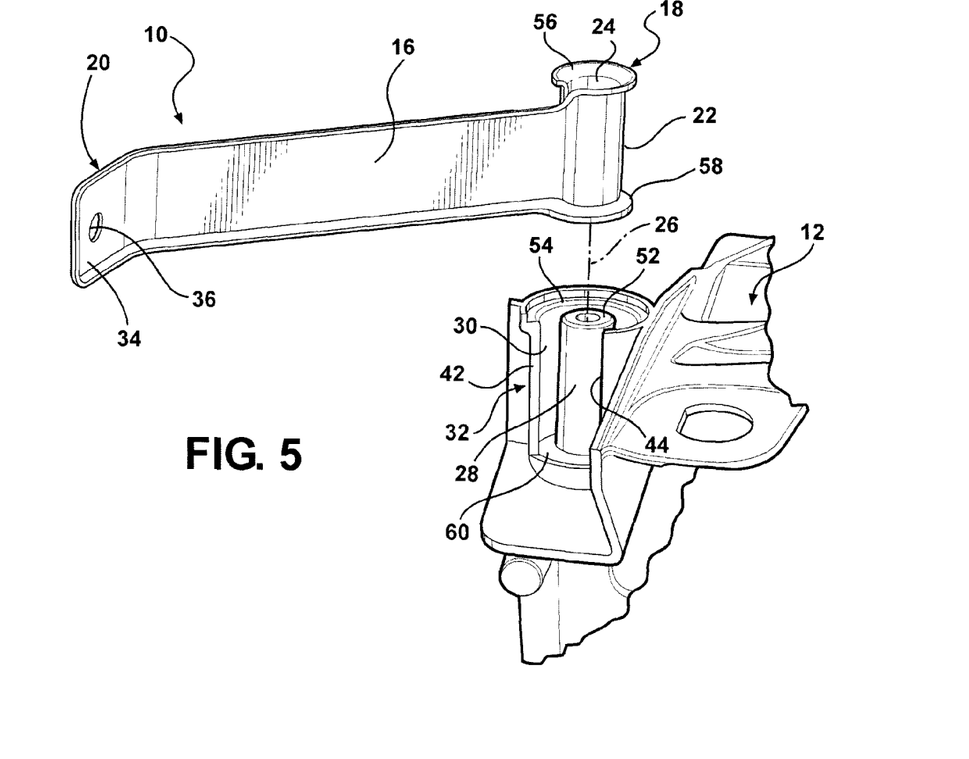
FIG. 5 is an exploded view of a carrier having a connector according to the present invention.
Figure 6:
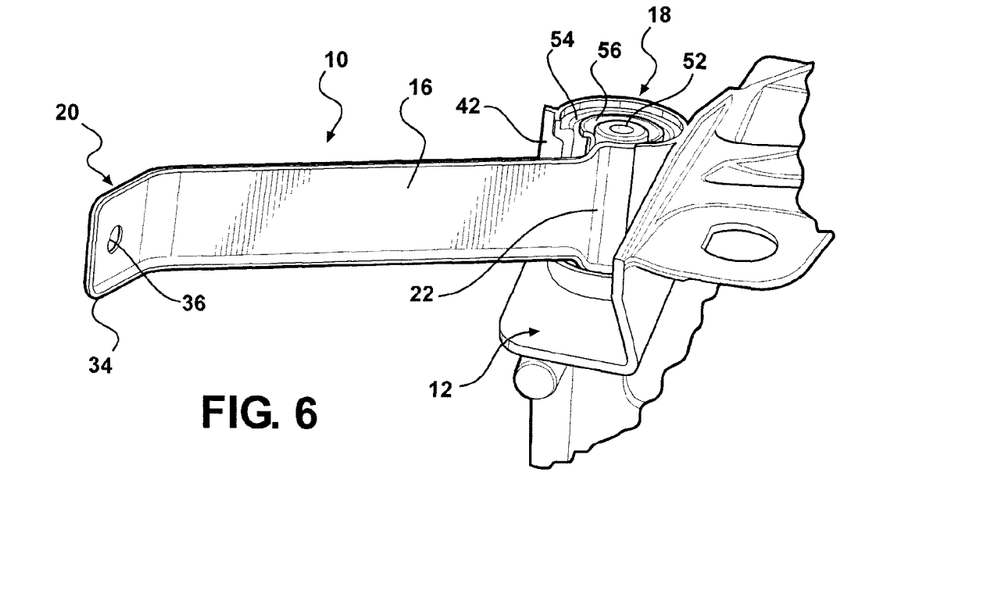
FIG. 6 is a perspective view of a carrier having a connector according to the present invention.

A connector for connecting two vehicle components according to the present invention is shown in the Figures generally at 10. The connector 10 is used for connecting a first vehicle component, which in this embodiment is a carrier, generally shown at 12, for the front of a vehicle, to a second vehicle component, which in this embodiment is a fender, generally shown at 14. The connector 10 includes a body portion 16 having a first end, generally shown at 18, and a second end, generally shown at 20. The first end 18 has a looped portion 22, with an aperture 24 extending through the looped portion 22. The connector 10 pivots about an axis 26, and the axis 26 is also in alignment with a protrusion 28 formed as part of the carrier 12. Substantially surrounding the protrusion 28 is a sleeve 30, which is also formed as part of the carrier 12. As can be seen in FIGS. 5 and 6, the sleeve 30 does not fully surround the protrusion 28, but rather there is a slot, generally shown at 32, the function of which will be described later.

The second end 20 includes a flange portion 34 which has an aperture 36. There is a fastener (not shown) which extends through the aperture 36 and also extends through a corresponding aperture 38 in a support member 40, the support member 40 is part of the fender 14.

To assemble the fender 14 to the carrier 12, the connector 10 is positioned such that the first end 18 is placed in the sleeve 30 and the protrusion 28 extends through the aperture 24 of the looped portion 22. This is best seen in FIGS. 5-6. The sleeve 30 substantially surrounds the looped portion 22, and the body portion 16 extends out of the slot 32. The connector 10 is able to pivot about the axis 26. As the connector 10 pivots, the looped portion 22 rotates about the protrusion 28, and the body portion 16 is able to pivot as well, the degree of possible rotation being determined by the width of the slot 32. More specifically, the slot 32 has a first wall 42 and a second wall 44, and the body portion 16 is pivotable between positions such that the body portion 16 contacts the first wall 42, the second wall 44, or may pivot to any position therebetween.

Figure 1:
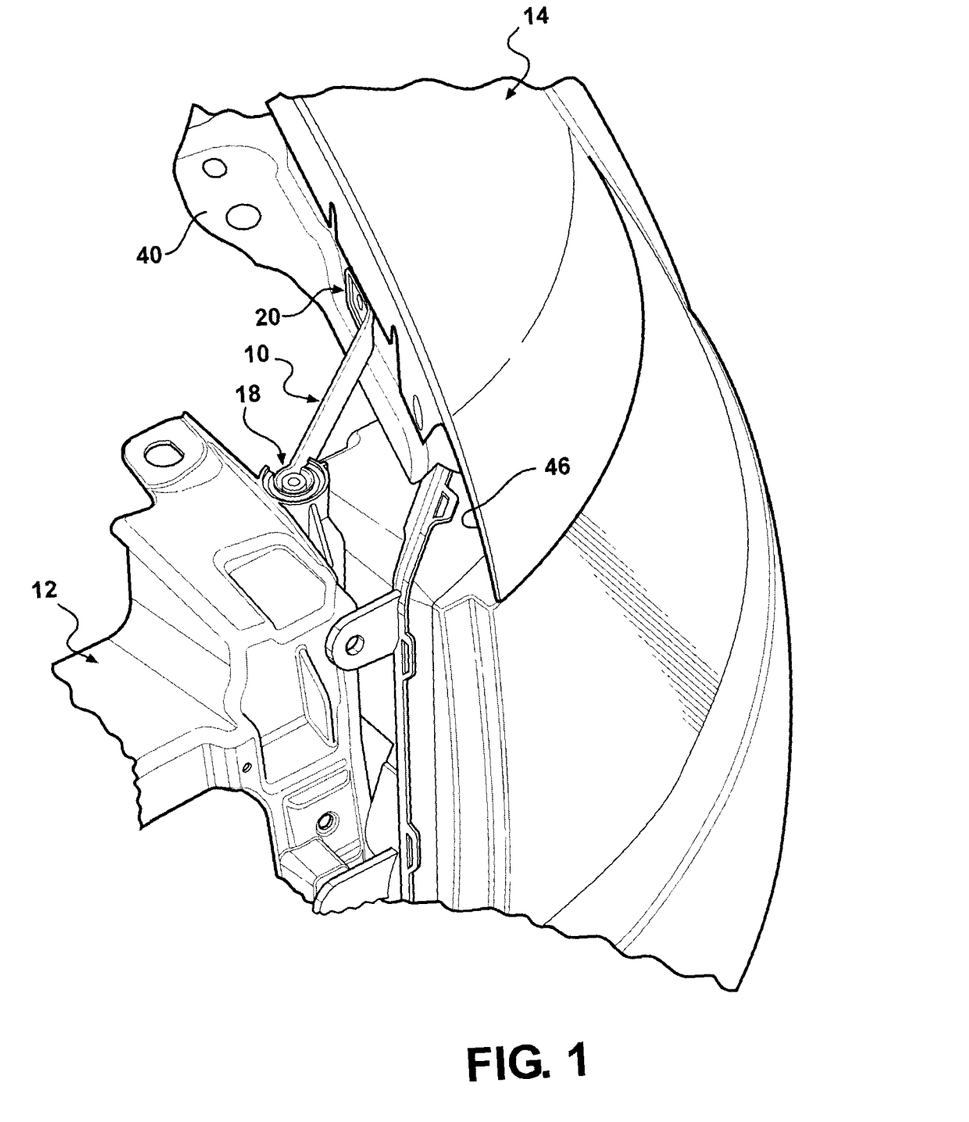
FIG. 1 is a perspective view of a connector used for connecting a carrier and a fender, according to the present invention.
Figure 2:
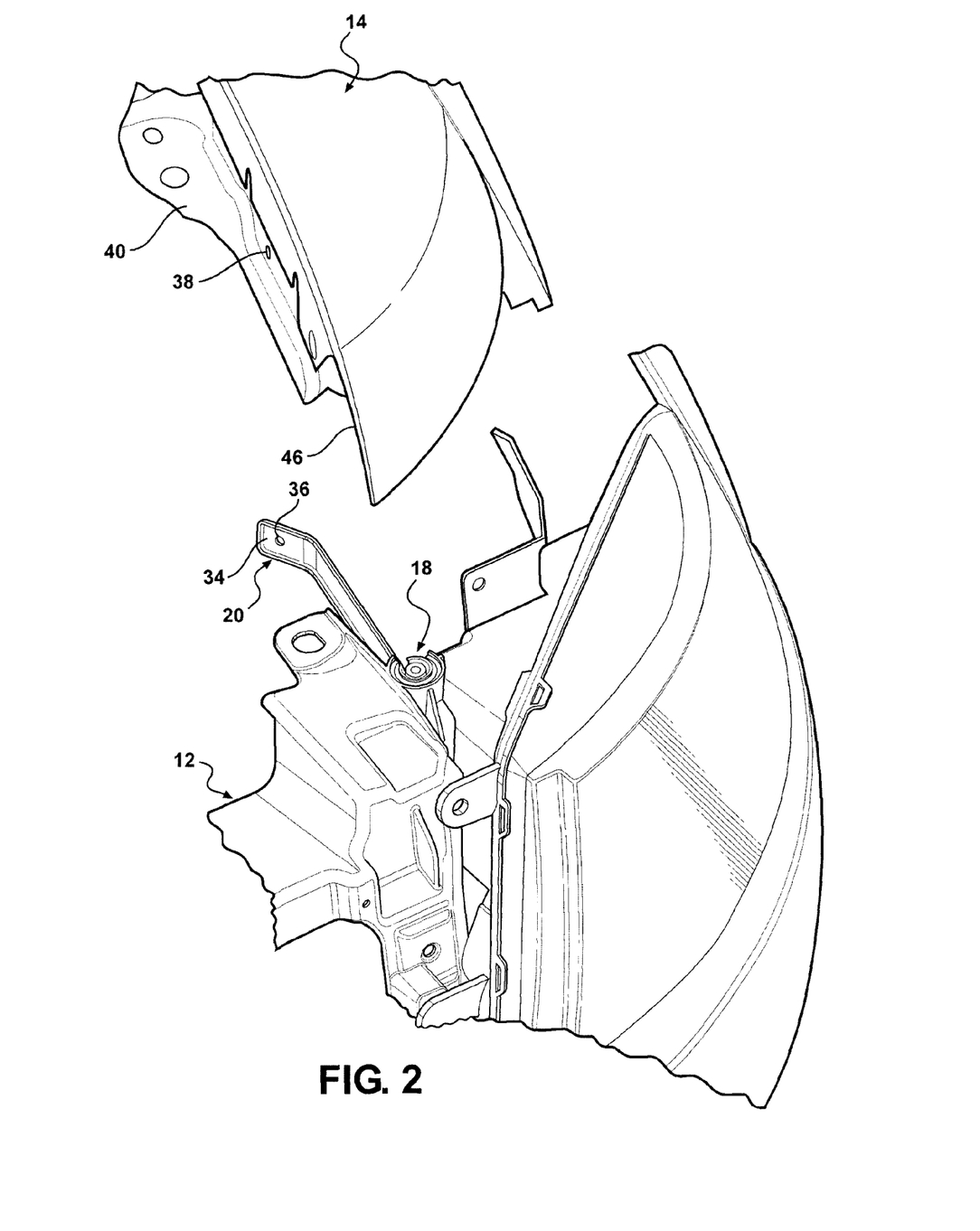
FIG. 2 is a perspective view of a connector used for connecting a carrier and a fender, with the fender detached from the connector, according to the present invention.
Figure 3:
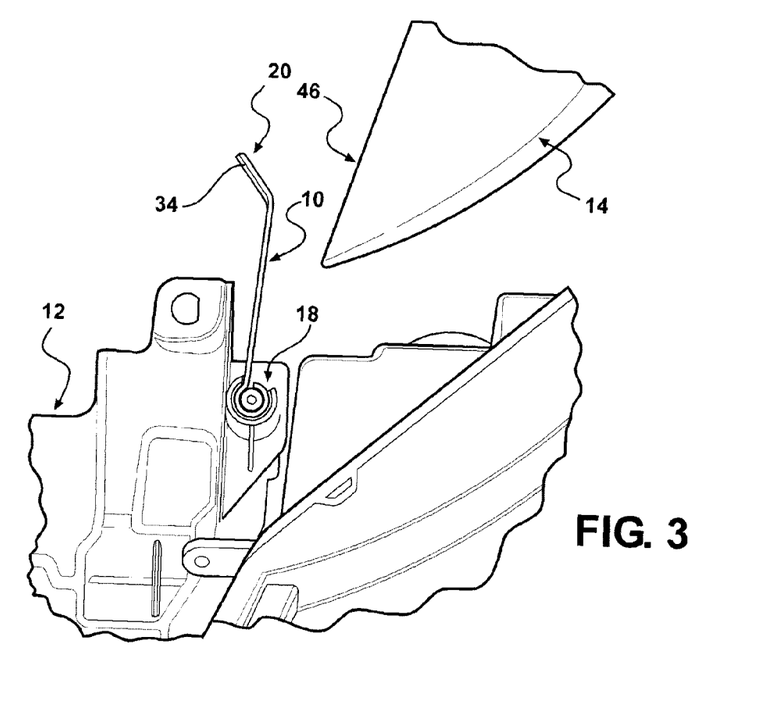
FIG. 3 is a top view of a connector used for connecting a carrier and a fender, with the fender detached from the connector, according to the present invention.
Figure 4:
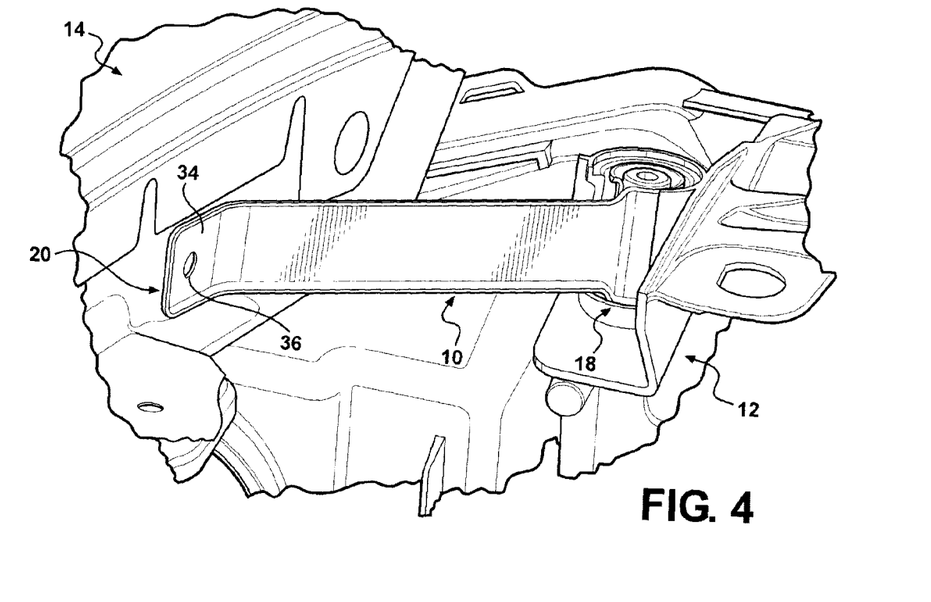
FIG. 4 is an enlarged second perspective view of a connector used for connecting a carrier and a fender, according to the present invention.
Figure 7:
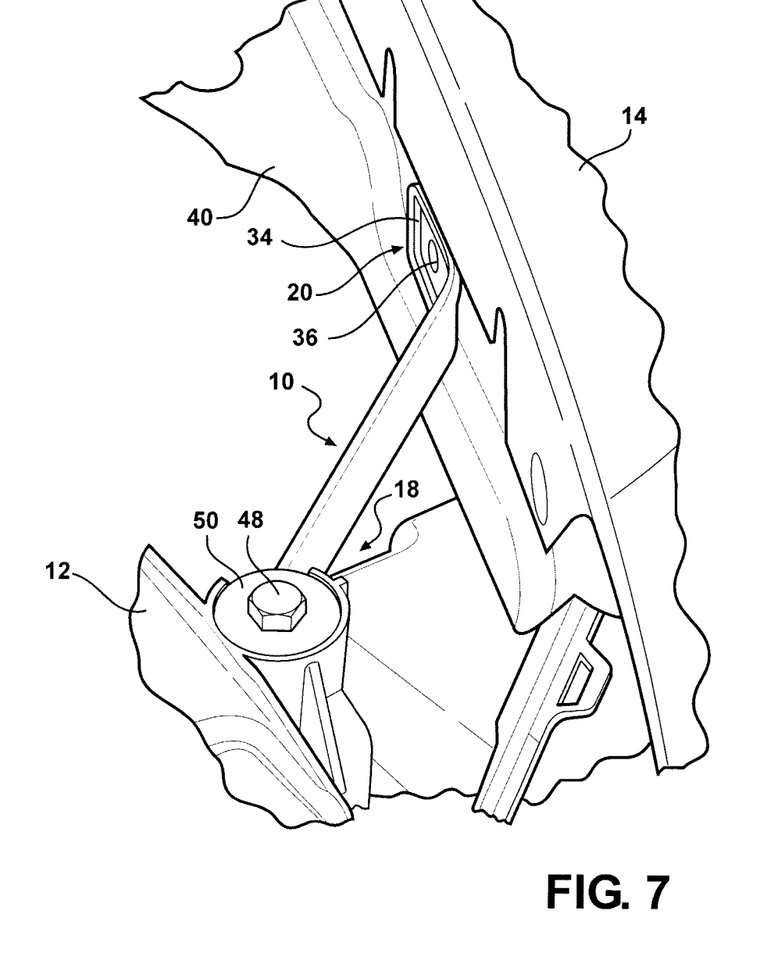
FIG. 7 is a third perspective view of a connector used for connecting a carrier and a fender, with the connector fastened to the carrier, according to the present invention.

Once the first end 18 of the connector 10 is placed onto the protrusion 28 and sleeve 30 such that the looped portion 22 substantially surrounds the protrusion 28 as shown in FIGS. 1-4 and 6, the connector 10 is pivoted about the axis 26 until the connector 10 is placed into the position shown in FIGS. 2 and 3. This allows the fender 14 to be pivoted about the axis 26 and be placed into the position as shown in FIGS. 1, 4, and 7. As can be seen in FIGS. 2 and 3, the fender 14 and support member 40 are shaped such that having the connector 10 formed as part of the carrier 12 or fender 14 would make it difficult to assemble the fender 14 and carrier 12. Essentially, the distance between an inside surface 46 near the front of the fender 14 and an inside surface of the fender on the opposite side of the vehicle (not shown) is narrower that the width between the flange 34 of the connector 10 (when the connector 10 is in the position shown in FIGS. 1 and 7) and a corresponding connector securing point (not shown) on the opposite side of the carrier 12, if the connector 10 was immovable in the position for engagement to the securing point. The connector 10 of the present invention is operable to pivot about the axis 26, which enables the fender 14 to be positioned to connect to the carrier 12 without interference from the connector 10.

After the carrier 12 and fender 14 are positioned to be connected. The connector 10 is pivoted about the axis 26 such that flange portion 34 contacts the support member 40 and the aperture 36 is in alignment with the corresponding aperture 38 of the support member 40. A fastener (not shown) is then inserted through the apertures 36,38 to secure the second end 20 to the support member 40. Another fastener 48 is inserted through a washer 50 and through an aperture 52 formed as part of the protrusion 28. The washer 50 is placed onto a lip portion 54 of the sleeve 30. As the fastener 48 is tightened, the washer 50 will apply a force to an upper lip portion 56, and correspondingly applies a force to a lower lip portion 58, both lip portions 56,58 being formed as part of the looped portion 22. The lower lip portion 58 rests on a bottom surface 60 connected to the sleeve 30, and is formed as part of the carrier 12.

Once the fastener 48 is tightened to secure the first end 18, and the fastener extending through the aperture 36 of the flange portion 34 is tightened, the connector 10 secures the fender 14 to the carrier 12. The present invention is not limited to the embodiment described, other types of pivot connections are possible for use with the first end 18 or the second end 20.

It should also be noted that while the connector 10 is made of steel, it is also within the scope of the invention that the connector 10 may be made of other materials as well (such as plastic or other thermoformed materials), while still retaining the same functionality.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A moveable connector for connecting two components on a vehicle, comprising:
    a body portion;
    a first end formed as part of said body portion, said connector being movable about at least one axis at said first end, and connected to a first vehicle component at said first end; and
    a second end formed as part of said body portion operable for being connected to a second vehicle component, wherein said first vehicle component is positioned relative to said second vehicle component and said connector is pivoted about said at least one axis to allow said second end to be connected to said second vehicle component;
    wherein said connector is movable from a first position, which reduces the overall dimensions of said first vehicle component during assembly to prevent interference when assembled to said second vehicle component, to a second position for providing a connection between said first vehicle component and said second vehicle component;
    a looped portion formed as part of said first end;
    an aperture extending through said looped portion;
    a protrusion formed as part of said first vehicle component and extending through said aperture of said looped portion when said first end is connected to said first vehicle component, a center of said protrusion being substantially aligned with said at least one axis;
    a sleeve substantially surrounding said looped portion, said sleeve being formed as part of said first vehicle component; and
    a slot formed as part of said sleeve, said body portion extending through said slot such that when said connector is moved about said at least one axis, said body portion pivots about said at least one axis and moves in said slot.

2. The moveable connector for connecting two components on a vehicle of claim 1, further comprising:
    a first wall formed as part of said slot; and
    a second wall formed as part of said slot, wherein said connector is pivotable about said at least one axis and said body portion is movable between said first wall and said second wall.

3. The moveable connector for connecting two components on a vehicle of claim 1, further comprising:
    an aperture formed as part of said protrusion;
    a lip portion formed as part of said sleeve;
    a washer having an aperture, said washer being located on said lip portion formed as part of said sleeve; and
    a fastener operable for being inserted through said aperture of said washer and said aperture formed as part of said protrusion such that said first end of said connector is secured to said first vehicle component.

4. The moveable connector for connecting two components on a vehicle of claim 3, further comprising:
    an upper lip portion formed as part of said looped portion;
    a lower lip portion formed as part of said looped portion; and
    a bottom surface formed as part of said first vehicle component in proximity to said sleeve, said sleeve being connected to said bottom surface such that as said fastener is inserted into said aperture of said washer and said aperture formed as part of said protrusion, said washer will apply a force to said upper lip portion, causing said lower lip portion to apply a force to said bottom surface formed as part of said first vehicle component, and compressing said looped portion.

5. The moveable connector for connecting two components on a vehicle of claim 1, further comprising:
   a flange portion formed as part of said second end;
   an aperture formed as part of said flange portion; and
   an aperture formed as part of said second vehicle component such that a fastener is operable to be inserted through said aperture formed as part of said flange portion and said aperture formed as part of said second vehicle component to secure said second end to said second vehicle component.

6. The moveable connector for connecting two components on a vehicle of claim 1, said first vehicle component further comprising a carrier.

7. The moveable connector for connecting two components on a vehicle of claim 1, said second vehicle component further comprising a fender.

8. A movable connector for connecting a two components of a vehicle, comprising:
   a body portion;
   a first end formed as part of said body portion;
   a looped portion formed as part of said first end and pivotally connected to a first vehicle component such that said connector is movable about an axis between a stowed position and a deployed position;
   a second end formed as part of said body portion selectively connectable to a second vehicle component; and
   a flange portion formed as part of said second end such that when said connector is in said stowed position, the overall dimensions of said first vehicle component are reduced to allow proper placement of said first vehicle component relative to said second vehicle component without interference from said connector during assembly, and said connector is movable to a second position after said first vehicle component is properly positioned relative to said second vehicle component such that said connector is moved to said deployed position and said flange portion is connected to said second vehicle component, securing said first vehicle component to said second vehicle component;
   an aperture formed by said looped portion;
   a protrusion formed as part of said first vehicle component, said protrusion extending through said aperture formed by said looped portion;
   a sleeve formed as part of said first vehicle component such that said sleeve substantially surrounds said protrusion;
   a bottom surface formed as part of said first vehicle component, said sleeve extending away from said bottom surface; and
   a lower lip portion formed as part of said looped portion and in contact with said bottom surface for supporting said connector as said connector pivots about said axis.

9. The movable connector for connecting two components of a vehicle of claim 8, further comprising:
   a slot formed as part of said sleeve such that said body portion extends through said slot;
   a first wall formed as part of said slot; and
   a second wall formed as part of said slot, wherein said body portion extends out of said slot between said first wall and said second wall, and is pivotable about said axis between said first wall and said second wall.

10. The movable connector for connecting two components of a vehicle of claim 9, further comprising:
    an aperture formed as part of and extending into said protrusion;
    a lip portion formed as part of said sleeve on the opposite side of said sleeve in relation to said bottom surface;
    a washer having an aperture, said washer operable for selective placement on said lip portion formed as part of said sleeve;
    an upper lip portion formed as part of said looped portion in contact with said washer when said washer is disposed on said lip portion formed as part of said sleeve; and
    a fastener operable for extending through said aperture formed as part of said protrusion and said aperture of said washer to secure said washer to said protrusion and said looped portion between said bottom surface and said washer.

11. The movable connector for connecting two components of a vehicle of claim 8, further comprising:
    an aperture formed as part of said flange portion; and
    an aperture formed in said second vehicle component such that a fastener is operable to be inserted through said aperture formed as part of said flange portion and said aperture formed as part of said second vehicle component to secure said second end to said second vehicle component.

12. The movable connector for connecting two components of a vehicle of claim 8, wherein said first vehicle component is a carrier.

13. The movable connector for connecting two components of a vehicle of claim 8, wherein said second vehicle component is a fender.

14. A moveable connector for connecting a carrier and a fender for a vehicle, comprising:
    a body portion;
    a looped portion having an aperture formed as part of said body portion, said looped portion substantially surrounded by a sleeve formed as part of said carrier, said looped portion surrounding a protrusion formed as part of said carrier such that said protrusion extends through said aperture formed as part of said looped portion, and said first end is pivotable about an axis; and
    a flange portion formed as part of said body portion operable for selective attachment with said fender;
    wherein said connector pivots about said protrusion between a stowed position, where the overall dimensions of the carrier are reduced to prevent interference between said carrier and said fender during assembly, and a deployed position for allowing said flange portion to be connected to said fender, securing said flange portion to said fender.

15. The moveable connector for connecting two components on a vehicle of claim 14, further comprising:
    an aperture formed as part of said protrusion;
    a lip portion formed as part of said sleeve;
    a washer having an aperture, said washer operable for being placed on said lip portion formed as part of said sleeve;
    an upper lip portion formed as part of said looped portion for selectively contacting said washer;
    a bottom surface formed as part of said carrier such that said sleeve extends from said bottom surface, and said lower lip portion contacts and is supported by said bottom surface;
    a lower lip portion formed as part of said looped portion and in contact with said bottom surface formed as part of said carrier; and
    a fastener operable for being inserted through said aperture formed as part of said washer and said aperture formed as part of said protrusion, causing said washer to apply a force to said upper lip portion and said bottom surface to apply a force to said lower lip portion, thereby securing said first end of said connector to said carrier, and securing said connector in said deployed position.

16. The moveable connector for connecting two components on a vehicle of claim 14, further comprising:
   a slot formed as part of said sleeve, said body portion extending through said slot;
   a first wall formed as part of said slot; and
   a second wall formed as part of said slot, wherein said body portion of said connector extends through said slot such that said connector is pivotable about said axis between said first wall and said second wall to reduce the dimensions of said carrier when said connector is in said stowed position.

17. The moveable connector for connecting two components on a vehicle of claim 14, further comprising:
   an aperture formed as part of said flange portion; and
   an aperture formed as part of said fender, wherein a fastener is operable for being inserted through said aperture formed as part of said flange portion and said aperture formed as part of said fender, securing said connector to said fender and in said deployed position.

\* \* \* \* \*